US007969763B2

(12) United States Patent
Kunemund

(10) Patent No.: US 7,969,763 B2
(45) Date of Patent: Jun. 28, 2011

(54) DETECTOR CIRCUIT FOR DETECTING AN EXTERNAL MANIPULATION OF AN ELECTRICAL CIRCUIT, CIRCUIT ARRANGEMENT COMPRISING A PLURALITY OF DETECTOR CIRCUITS, MEMORY DEVICE AND METHOD FOR OPERATING A DETECTOR CIRCUIT

(75) Inventor: Thomas Kunemund, Munich (DE)

(73) Assignee: Infineon Technologies AG (DE)

( * ) Notice: Subject to any disclaimer, the term of this patent is extended or adjusted under 35 U.S.C. 154(b) by 1238 days.

(21) Appl. No.: 11/567,533

(22) Filed: Dec. 6, 2006

(65) Prior Publication Data

US 2007/0182575 A1    Aug. 9, 2007

(30) Foreign Application Priority Data

Dec. 6, 2005  (DE) .......................... 10 2005 058 238

(51) Int. Cl.
*G11C 17/00* (2006.01)

(52) U.S. Cl. ............ 365/96; 365/64; 365/112; 365/241; 365/154

(58) Field of Classification Search .................... 365/53, 365/185.04, 154, 226, 241, 112, 64
See application file for complete search history.

(56) References Cited

U.S. PATENT DOCUMENTS

| 3,731,119 | A | * | 5/1973 | Matzen | 327/199 |
| 4,043,321 | A | * | 8/1977 | Soldner et al. | 600/451 |
| 4,413,327 | A | * | 11/1983 | Sabo et al. | 711/162 |
| 5,159,629 | A | * | 10/1992 | Double et al. | 713/194 |
| 7,042,752 | B2 | * | 5/2006 | Okuda | 365/112 |

FOREIGN PATENT DOCUMENTS

| DE | 197 41 178 A 1 | 12/1998 |
| DE | 10 2004 020 870 A1 | 11/2005 |
| EP | 0785623 | 7/1997 |

* cited by examiner

*Primary Examiner* — Pho M Luu
*Assistant Examiner* — Tha-O Bui
(74) *Attorney, Agent, or Firm* — Dickstein Shapiro LLP

(57) ABSTRACT

A detector circuit for detecting an external manipulation of an electrical circuit. The detector circuit includes a digital circuit which is sensitive to at least one of the effects of ionizing radiation or fluctuations of a supply voltage, and the output state of the digital circuit is indicative of an attack.

8 Claims, 4 Drawing Sheets

DETECTOR CIRCUIT FOR DETECTING AN EXTERNAL MANIPULATION OF AN ELECTRICAL CIRCUIT, CIRCUIT ARRANGEMENT COMPRISING A PLURALITY OF DETECTOR CIRCUITS, MEMORY DEVICE AND METHOD FOR OPERATING A DETECTOR CIRCUIT

CROSS-REFERENCE TO RELATED APPLICATION

This application claims priority to German Patent Application Serial No. 10 2005 058 238.9, which was filed Dec. 6, 2005, and is incorporated herein by reference in its entirety.

BACKGROUND

In many circuits measures are provided for preventing secret data from being able to be read out. This is necessary particularly when security-critical data are processed, as is often the case with smartcards. Smartcards are used as an authentication tool or for banking applications, which increases the security requirements. Measures for restricting access are implemented at the level of an operating system or an application, a limitation to specific address ranges or specific addresses being effected. The protective measures can be used to ensure that only specific users or specific applications can access security-critical data.

Attackers pursue the aim of overcoming the implemented security measures and of obtaining access to secret data. A further aim may be to obtain insights about the construction of the circuit.

In the past, the aim of defense has been to prevent or at least make more difficult the analysis and manipulation of the integrated circuits by means of the specific construction of the circuit. An attempt to achieve this aim has involved, on the one hand, concealed structuring of the critical lines in the wiring plan and, on the other hand, application of a dedicated, covering protective plane above the relevant wiring planes. In the case of these protective planes, called "shields", meandering or lattice-shaped lines are realized e.g. in pairs in the protective plane, in the event of whose interruption or short circuit for the case where different voltages are present the detecting sensor initiates an erasure of the memory, a reset or the nonfunctionality of other circuit sections. These lines, referred to as "passive", can likewise be embodied as unconnected, voltageless lines. In this case, they serve merely for increasing the complexity during the attack or for the purpose of confusion.

The security of the components can be additionally increased by the passive lines described being replaced by so-called active lines in the design of the wiring plan. In the case of the active lines, signals are applied to the lines of the shield by drive circuits, which signals are analyzed by evaluation circuits and compared e.g. with reference signals. Owing to the possible variation of the signals, in this case the shield can only be circumvented by the very complicated laying of a bypass line and by the application of the FIB method.

In the case of attacks using ionizing radiation or targeted fluctuations of the supply voltage or the manipulation of clock edges, one possibility for defense consists in detecting the causes of the manipulations, that is to say in identifying the ionizing radiation or the supply voltage fluctuations. This requires the presence of specially provided sensors which are sensitive to the various types of attack in various attack scenarios. That means for example that the radiation or supply voltage fluctuations are measure and evaluated by a control circuit. The sensors are sensitive to a limited set of attacks, and, consequently, by way of example, new attacks to which a set of sensors of a cryptocontroller is not sensitive will lead with some probability to a successful fault attack. The number of sensors for an integrated circuit with high security requirements has to be very high. If only a few sensors are provided, no protection is afforded against "local radiation attacks" on individual or a few memory cells or gates.

BRIEF DESCRIPTION OF THE SEVERAL VIEWS OF THE DRAWINGS

Embodiments of the present inventions are described hereinafter, making reference to the appendent figures.

DETAILED DESCRIPTION OF THE INVENTION

Figure 1:
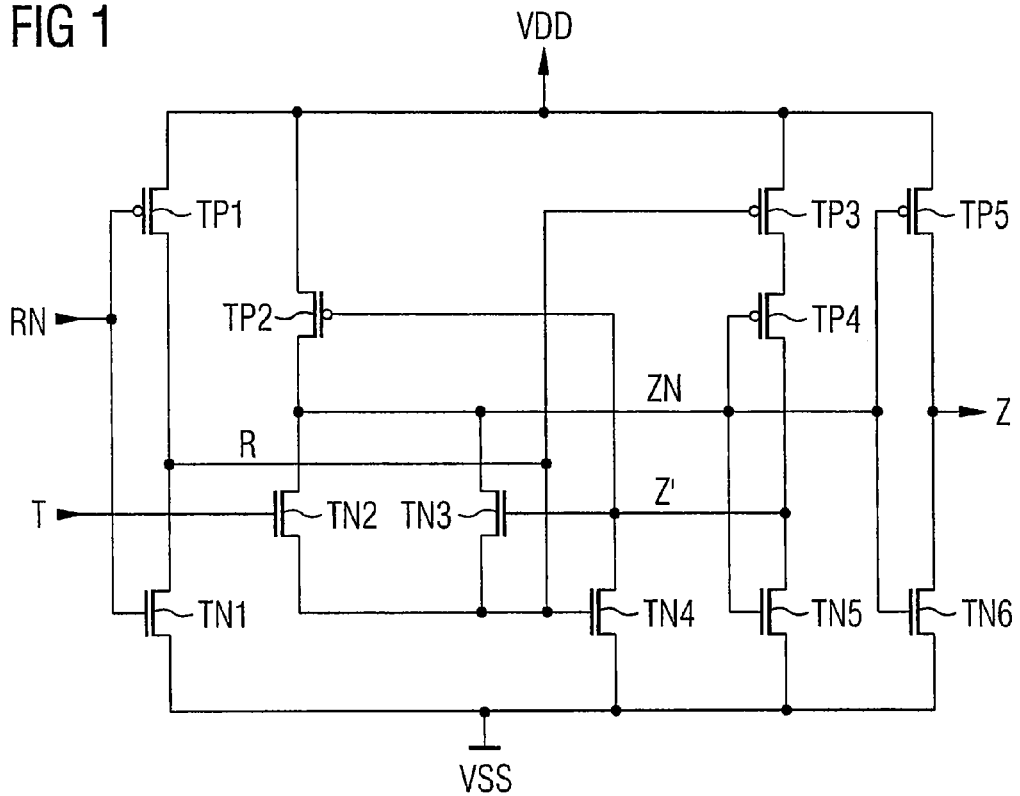
FIG. 1 shows a detector circuit according to an embodiment of the invention in a version which is suitable for semi-custom implementation, that is to say is embodied as an element of a standard cell library.

FIG. 1 illustrates a detector circuit according to an embodiment of the invention. The variant of a circuit as illustrated in FIG. 1 is suitable for a semi-custom design. This means that the circuit as it is represented can be included as a standard cell in a library. From the library, it can be inserted in the course of the circuit design, in which case no particular circumstances have to be taken into consideration with regard to the signal levels and currents at inputs and outputs, rather only the logic level of signals that are present or are output is significant.

The circuit illustrated in FIG. 1 can be interpreted as a modified so-called reset-set latch (RS latch), that is to say as a bistable storage circuit, the storage or latch nodes of which are designated by Z' and ZN. Furthermore, p-channel transistors and n-channel transistors are designated by TPx and TNx, respectively, x=1, 2, . . . .

Setting of Z' to VDD and simultaneous resetting of ZN to VSS is achieved by means of an active, i.e. high level VDD at the set input T if RN is simultaneously inactive, i.e. equal to VDD. ZN is then connected to VSS via the conducting transistors TN1 and TN2, the consequence of which is that Z' is connected to VDD via the conducting transistors TP3 and TP4. If T is then deactivated again, i.e. set to VSS (without RN being activated, i.e. RN remains at VDD), then the state Z'=VDD, ZN=VSS is maintained since a reciprocal feedback exists between Z' and ZN via the conducting transistors TP3, TP4 and TN3.

As explained further below, this setting into a second state Z'=VDD, ZN=VSS by means of T=VDD, RN=VDD serves, on the one hand, for testing the correct function of the digital detector circuit and can be used, on the other hand, for identifying the above-described attacks on set-up and hold times.

In a simplified method for operating a detector circuit according to an embodiment of the invention, this step can be omitted.

Resetting of Z' to VSS and simultaneous setting of ZN to VDD is achieved by a low level VSS at the reset input RN: the signal R generated by means of the inverter formed from TP1 and TN1 then assumes the value VDD, so that Z' is connected to VSS via TN4, which in turn has the consequence that the node ZN is connected to VDD via the conducting transistor TP2 (the level of T, the set input, is unimportant for the reset operation). If RN is then deactivated again, i.e. set to VDD (without T being activated, i.e. T is at VSS), then the state Z'=VSS, ZN=VDD is maintained since a reciprocal feedback exists between Z' and ZN via the conducting transistors TP2 and TN5.

The first state Z'=VSS, ZN=VDD brought about by this reset operation is, then, that state which is particularly sensitive to attacks using ionizing radiation and great fluctuations of VDD-VSS since such attacks lead to a state change to Z'=VDD, ZN=VSS even if the "intensities" of the respective attacks still do not suffice to bring about state changes in the most sensitive actual attack targets such as e.g. SRAM cells. This increased sensitivity is achieved by asymmetrical dimensioning of channel widths and lengths and also "drain" regions of some transistors within the digital detector circuit: large channel lengths and/or small channel widths of the transistors TP2, TN4, TN5, small channel lengths and/or large channel widths of the transistors TP3, TP4, TN2, TN3 and also enlarged "drain" regions of TP4, TN2 and TN3 mean, on the one hand, a significant increase in negative charge transfers on ZN as a result of ionizing radiation on TN2, TN3 compared with those on Z' as a result of ionizing radiation on TN4, TN5; an analogous situation conversely holds true for a significant increase in positive charge transfers on Z' as a result of ionizing radiation on TP4, compared with those on ZN as a result of ionizing radiation on TP2. The "toggling" of the state Z'=VSS, ZN=VDD to Z'=VDD, ZN=VSS is further promoted by the increases in the current yield of TP3, TP4, TN2, TN3 and decreases in the current yield of TP2, TN4, TN5 brought about by the "skew" dimensionings. These also have the effect that the digital detector circuit has a preferred state, that is to say that when the level of the supply voltage is switched up from VSS (that is to say ground) to the respective nominal value VDD at which the circuits of the IC are operated, the state Z'=VDD, ZN=VSS, that is to say the "alarm state", is always established. This property means that the digital detector circuit has a significantly increased sensitivity—compared with symmetrically dimensioned "attack targets" such as SRAM cells—to so-called spike attacks by means of large fluctuations of VDD-VSS.

The "alarm" state Z'=VDD, ZN=VSS brought about by one of the attacks described above is indicated externally by the output signal Z formed from ZN by means of the inverter comprising TP5 and TN6, the output signal then assuming the level VDD.

The use of digital detector circuits for identifying the attacks on set-up and hold times as described in more detail above and also the test mode of a system of digital detector circuits will now be explained in more detail with reference to FIG. 2.

Figure 2:
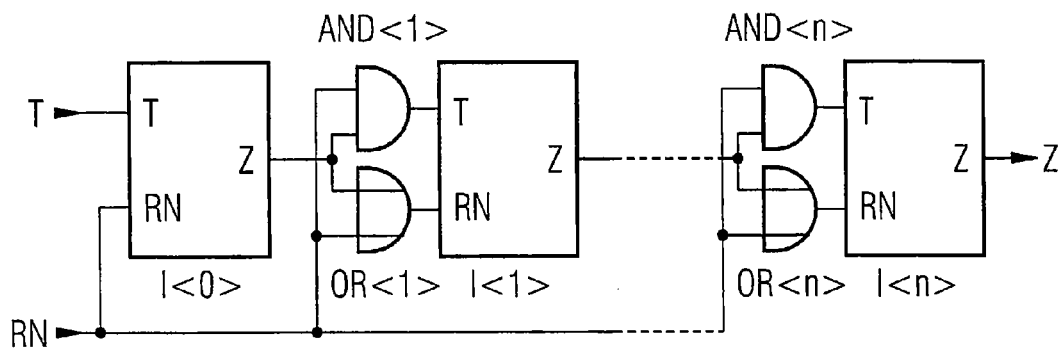
FIG. 2 shows a combination of a plurality of detector circuits in accordance with FIG. 1.

FIG. 2 shows a chain of n+1 digital detector circuits I<j> where j=0 . . . n, which are also referred to as "fault attack detection standard cell". In this case, the T and RN inputs of I<1>, . . . I<n> are driven by AND and OR gates AND<1>, . . . AND<n> and OR<1>, . . . OR<n>, respectively, the inputs of AND<j> and OR<j> in each case being connected to the Z output of I<j−1> and the RN input RN of the overall circuit. The inputs of I<0> are driven by the T and RN inputs T and RN, respectively, of the overall circuit.

T=VSS, RN=VSS holds true for the reset state of the overall circuit, so that the Z output of I<0> initially attains VSS, which means that the T and RN inputs of I<1>, via AND<1> and OR<1>, likewise in each case assume the value VSS, that is to say also set the Z output of I<1> to VSS. This in turn means that, in an analogous manner, the Z outputs of I<2>, . . . I<n> then also successively attain VSS, so that all I<j>, j=0, . . . , n are therefore reset successively, and the Z output Z of the overall circuit is finally reset to VSS.

The result of this reset state is the initial state for the test mode, in which RN is firstly deactivated, that is to say is set to be equal to VDD, as a result of which the levels VDD are attained at the RN input of I<0> and, via the OR<j>, j=1, . . . , n, also at the RN inputs of all I<j>. T is then activated, that is to say raised from VSS to VDD. As a result, firstly I<0> is set, as described above, that is to say that the Z output of I<0> assumes the value VDD. As a result, however, the level VDD is also attained at the T input of I<1>, as a result of which I<1> is set, that is to say that the Z output of I<1> also attains VDD. This in turn means that, in an analogous manner, the Z outputs of I<2> . . . I<n> then also successively attain VDD, so that all I<j>, j=0 . . . n are therefore set successively, and the Z output Z of the overall circuit is finally set to VDD.

By means of this test mode, it is possible to test the correct function of all I<j> and also the integrity of the connections between them, to be precise at any time that is predetermined by the respective system or desired by the user.

After a further resetting of the I<j> as described above, the Z outputs of all I<j> are at the level VSS and RN may be deactivated again, that is to say be at VDD, but T shall remain deactivated, that is to say at the VSS level. In this mode, referred to as "static fault attack detection", all I<j> are now sensitive to fault attacks, and as soon as the Z output in one of the I<j> is raised to VDD as a result of a fault attack as described above, this value propagates via all AND<j+1>, . . . AND<n> and I<j+1>, . . . I<n> to the output Z of the overall circuit, whereby a detected fault attack is indicated.

A further possible mode, referred to as "dynamic fault attack detection", consists in periodic setting and resetting of the Z outputs of all I<j> as described above, it being possible for this to be coupled with a suitable clock signal as follows: with the rising clock edge, the sequence referred to as the test mode above is activated, that is to say that all I<j> are set successively, so that finally Z attains VDD. With the falling clock edge, the resetting described above is then carried out, that is to say that all I<j> are reset successively, so that finally Z attains VSS, if this operation proceeds rapidly enough, that is to say is concluded before the next rising clock edge (it is assumed in this case that Z is clocked into a register (not depicted in FIG. 2) with the rising clock edge). If this is not the case, however, a detected fault attack is indicated by Z at VDD level (or at the output of the register), which fault attack may have been carried out, then, not only on an individual one of the cells I<j>, but also—as described above—on the supply voltage and/or the clock signal, in order to manipulate critical paths and the signal propagation times assigned thereto or to violate set-up and hold times. In this case, attacks on set-up and hold times can be detected by suitably long or short chains of digital sensor cells.

It should be taken into consideration that all of the gates AND<j> and OR<j> can be omitted if this mode of "dynamic fault attack detection" is not intended or does not have to be implemented, e.g. in order to save energy and area. On the other hand, if the energy consumption is primarily of importance, this mode can be activated in each case only when e.g. security-critical sequences and data are intended to be protected. Since this last is usually the case only for a very small proportion of the activity of a security IC, the additional energy consumption can then be disregarded.

Figure 3:
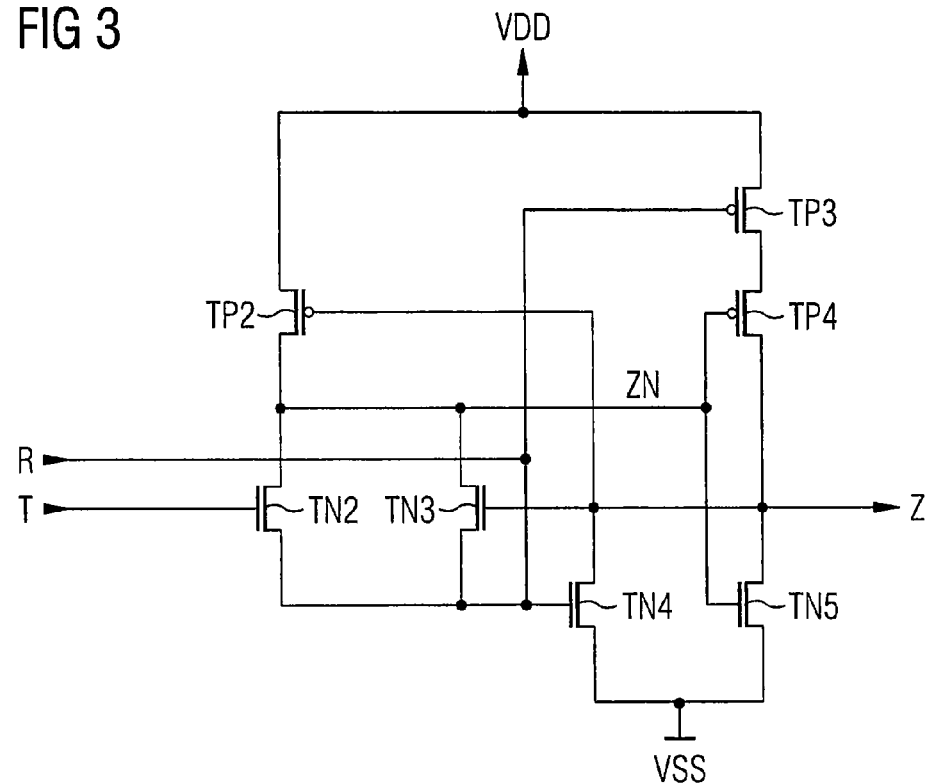
FIG. 3 shows a detector circuit according to an embodiment of the invention in a version which is suitable for full-custom implementation, that is to say can be integrated into a full-custom circuit, for example into an SRAM or a full-custom data path.

FIG. 3 shows an embodiment of a digital detector circuit in a version which is suitable for full-custom implementation (that is to say can be integrated into a full-custom circuit, for example into an SRAM or a full-custom data path. This circuit emerges from the circuit of FIG. 1 by omitting the inverters formed from TP1 and TN1 and also TP5 and TN6.

Since the inverter formed from TP1 and TN1 in FIG. 1 is omitted in the circuit of FIG. 3, R is now an input signal. Since R is connected to the sources of the n-channel transistors TN2 and TN3, the inverter formed from TP1 and TN1 was added for the standard cell variant of FIG. 1 in order to ensure simpler and more reliable characterizability of the RN input.

The output Z of FIG. 3 further corresponds to the signal Z' of FIG. 1 because the inverter formed from TP5 and TN6 in FIG. 1 for the decoupling of the nodes ZN (and Z') from the capacitance at the output Z of FIG. 1 has been omitted in the circuit of FIG. 3 since, in full-custom structures, there is full control via the respective node capacitances.

Figure 4:
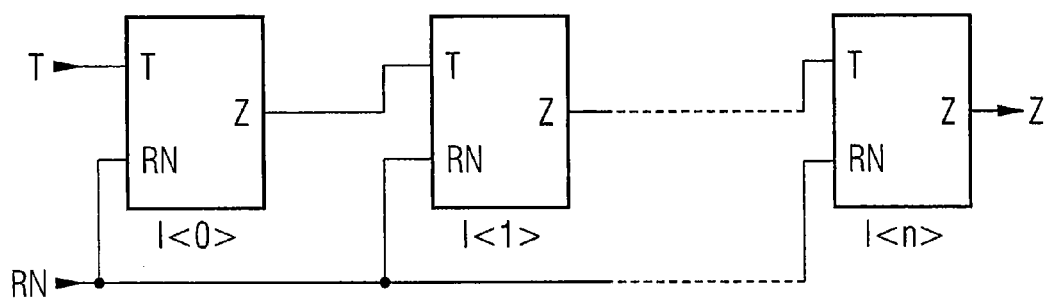
FIG. 4 shows a combination of a plurality of detector circuits in accordance with FIG. 3.

FIG. 4 shows a possible integration of the detector circuit of FIG. 3 within a full-custom circuit. Compared with FIG. 2, as already noted above, all the AND and OR gates between the elements I<j> of the chain of detector circuits have been omitted, so that that arrangement is not suitable for detecting attacks on set-up and hold times.

Further variants and combinations are possible over and above the detector circuits of FIG. 1 and FIG. 3, e.g. a cell comprising
  on the input side a first circuit as in FIG. 1, but without the inverter formed from TP5 and TN6, and with Z'=Z as signal output;
  followed by a second circuit as in FIG. 3, the R input of which is connected to the signal R of the first circuit and the T input of which is connected to the output Z of the first circuit;
  on the output side a third circuit as in FIG. 3, but with an inverter at the output for the inversion of the signal ZN as in FIG. 1, the R input of which is connected to the signal R of the first circuit and the T input of which is connected to the output Z of the second circuit.

Transistors and area can thus be saved compared with a chain as in FIG. 2. Such a circuit or a similar circuit can be used e.g. within a "regular" circuit in order to realize strip-type regions for detecting fault attacks.

Figure 5:
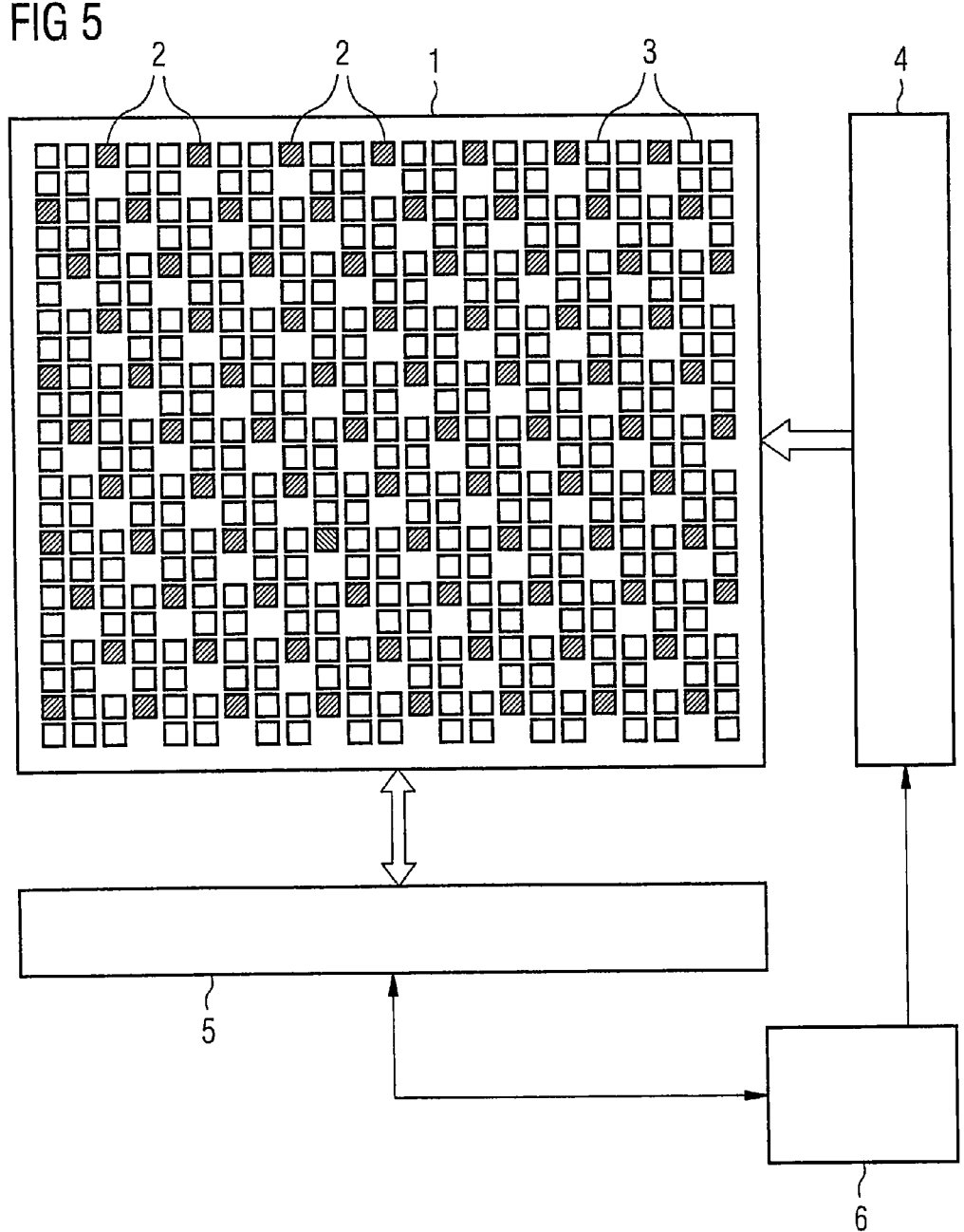
FIG. 5 shows a memory array with detector cells incorporated therein.

FIG. 5 shows a memory array comprising a multiplicity of memory cells 3 and a multiplicity of detector cells 2 arranged in between, the detector cells being illustrated in hatched fashion. The ratio of the number of detector cells to the number of memory cells is 1/4. In the schematic illustration shown, the detector cells are distributed uniformly over the memory array. However, a nonuniform distribution could also be provided. The distance between two detector cells is preferably so small that it is not possible to use a focused light beam to act on a memory cell without an adjacent detector cell concomitantly being irradiated in the process. It is thus ensured that the attack is detected upon every manipulation attempt.

The memory cells are conventionally driven or read by means of a row decoder 4 and a column decoder 5. The driving of the memory cells is controlled by a control device 6.

Figure 6:
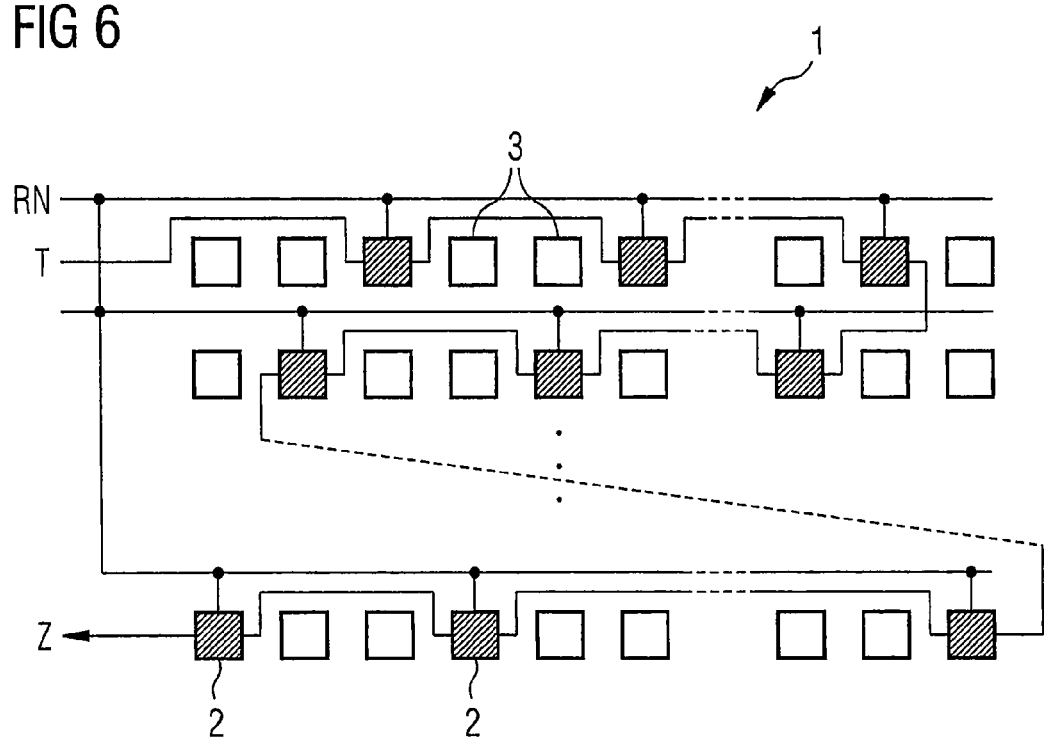
FIG. 6 shows the connection of detector cells in a memory array in accordance with FIG. 5.

As can already be gathered from FIGS. 2 and 4, the detector cells are in each case driven with two signals, namely the set signal T and the reset signal RN or R. The reset signal RN or R is fed to all of the detector cells in parallel, as is illustrated in FIG. 6. The set signal T is obtained from a detector cell connected upstream in a chain of detector cells. Therefore, an input of one detector cell is connected to a respective output of another detector cell. The output signal is provided at the end of the chain by the last detector cell. The wiring outlay is very low as a result of this concatenated arrangement.

It is now proposed to provide a detector circuit for detecting an external manipulation of an electrical circuit comprising a digital circuit having a first state and a second state, the digital circuit being sensitive to at least one of the effects of ionizing radiation or fluctuations of a supply voltage and the output state of the digital circuit being indicative of an attack. A digital circuit can be designed very small and it is therefore possible to provide many detector circuits without using an extended area of an integrated circuit.

For example a flip-flop circuit can be used. In an embodiment of the invention a very small flip-flop circuit includes a reset-set latch with a reset input, a set input and at least one output node, the latch having a first transistor of a first conductivity type, the gate terminal of which is connected to the set input and the source terminal of which is connected to the reset input, having a second transistor of the first conductivity type, the drain terminal of which is connected to the drain terminal of the first transistor, the source terminal of which is connected to the source terminal of the first transistor, having a third transistor of a second conductivity type, the drain terminal of which is connected to the drain terminal of the first transistor and the source terminal of which is connected to a first supply voltage potential, having a fourth transistor of the first conductivity type, the gate terminal of which is connected to the source terminal of the first transistor, the source terminal of which is connected to a second supply voltage potential and the drain terminal of which is connected to the gate terminal of the second transistor, the gate terminal of the third transistor and also the output node, having a fifth transistor of the second conductivity type, the source terminal of which is connected to the first supply voltage potential and the gate terminal of which is connected to the reset input, having a sixth transistor of the second conductivity type, the source terminal of which is connected to the drain terminal of the fifth transistor, the drain terminal of which is connected to the output node and the gate terminal of which is connected to the drain terminal of the first transistor, having a seventh transistor of the first conductivity type, the drain terminal of which is connected to the output node, the source terminal of which is connected to the second supply voltage potential and the gate terminal of which is connected to the gate terminal of the sixth transistor.

An exemplary method for operating a detector circuit for detecting an external manipulation of an electrical circuit comprising at least one digital circuit having a first state and a second state includes initializing the detector circuits into the first state, evaluating the state of the detector circuits, and generating an alarm signal if at least one of the detector circuits has the second state.

The digital circuit provided as a detector is so small that it can be provided at many locations of a circuit to be protected. The circuit provided is on the one hand sensitive to the effect of ionizing radiation or fluctuations of VDD-VSS (VDD and VSS designate the higher and lower supply voltage, respectively) and on the other hand is very similar to the most sensitive attack targets, that is to say to the "regular" digital circuits that are most sensitive to these attacks. Ideally, such a detector circuit includes a sub circuit having a somewhat higher sensitivity than the most sensitive targets of these attacks. The latter comprise for example 6-transistor SRAM cells or the paths that are to be regarded as very "critical" between two respective register stages.

For identifying an attack using ionizing radiation, the same physical effect is exploited here as for the attack itself: the charge separation or the short circuit by means of reverse-biased pn junctions if the latter are exposed to ionizing radiation, that is to say radiation that generates electron-hole pairs, such as photons or alpha particles.

The same applies to attacks through targeted fluctuations of the supply voltage with the aim of either erasing or setting a bit stored in a memory device (for example an SRAM cell or a register), which is possible for great fluctuations of the order of magnitude of VDD-VSS, or else of altering critical propagation times between two register stages in such a way that set-up or hold times of receiver registers are violated and incorrect (computation) results are thus clocked into the registers. This can already be achieved with moderate fluctuations of VDD-VSS in the region of a few hundred millivolts. In this case, the set-up time is the time for which a signal must be present in order to be correctly accepted. The hold time is that time for which the signal must still at least be present after acceptance.

The same applies in turn to attacks by manipulation of clock edges with the aim of violating set-up or hold times of receiver registers and thus clocking incorrect (computation) results into the registers.

In the latter cases, too, the same physical effect is to be exploited as for the attack itself, which can be realized the most simply by the digital detector circuit being as similar as possible to the attack targets.

In this case, a plurality of digital detector circuits according might be connected to one another.

On account of the small size, it is possible, in conjunction with tenable additional outlay, to provide very many detector circuits and, if appropriate, to incorporate them into a memory array. The ratio of detector cells (detector circuits) to memory cells is preferably 1/10 to 1. In the case of the semiconductor technology currently used, namely a 130 nm CMOS technology, the area requirement is approximately 5 $\mu m^2$ per detector cell. If a technology that enables smaller structures is used, then the area requirement for a detector cell would decrease correspondingly.

There are different attack mechanisms. In order to attain the desired information about memory content or circuit construction, firstly a so-called reverse engineering is carried out, in the course of which the integrated circuit is analyzed. Afterward, inter alia, the mode of operation of the circuit is altered or a data manipulation is carried out in the memory. The material covering the chip and also a part of the upper layers protecting the wiring of the chip are typically removed during this analysis. The upper interconnects that are then uncovered are usually non-security-relevant lines which can be bypassed by so-called bypass lines in order to reach further to deeper layers and lines. With some outlay, these steps can be carried out nowadays using the "FIB method" ("Focused Ion Beam"). As soon as deeper, security-relevant and thus critical lines are reached, either signals and pulses can be tapped off on the lines (so-called "probing"), or signals can be applied to these lines in order to manipulate data (so-called "forcing").

During an attack with ionizing radiation, data are altered on lines of the circuit arrangement, so that complete monitoring by the security mechanisms implemented is no longer possible. This exploits the physical effect that, in the case of reverse-biased pn junctions, charge separation and hence a short circuit are effected if an ionizing radiation, that is to say radiation that generates electron-hole pairs, such as photons or alpha particles, acts on the pn junction. The short circuit can cause the signal state of a data line to change from "1" to "0" or from "0" to "1", so that further processing is effected with "these incorrect" data. By way of example, data are consequently read out from memory areas which are actually blocked for access.

A further attack technique consists in the manipulation of clock edges or in a targeted manipulation of the power supply, whereby it is possible to achieve an irregular change in the mode of behavior of the electronic components.

Further configurations of circuits are within the discretion of the person skilled in the art. The invention is not restricted to the exemplary embodiments shown. In particular, elements of the exemplary embodiments shown can also be combined with one another.

What is claimed is:

1. A circuit arrangement comprising a network with a plurality of detector circuits for detecting an external manipulation of an electrical circuit, each of the detector circuits comprising a digital circuit having a first state and a second state, wherein the digital circuit is sensitive to at least one of the effects of ionizing radiation and fluctuations of a supply voltage, and an output state of the digital circuit is indicative of an attack, wherein the detector circuits form a chain in which an output of one detector circuit is connected to an input of another detector circuit, the output node of the last detector circuit of the chain forms the output node of the chain, and the state of the output node is indicative of an attack against the circuit arrangement.

2. The detector circuit according to claim 1, wherein the digital circuit is a flip-flop circuit comprising a reset-set latch with a reset input, a set input and at least one output node.

3. The detector circuit according to claim 2, wherein the digital circuit has an unequal sensitivity, so that, in case of impact of an ionizing radiation or fluctuations of a supply voltage, the digital circuit is more sensitive to switch from the first state to the second state than to switch from the second state to the first state.

4. The detector circuit according to claim 3, wherein the digital circuit comprises at least two transistors having at least one of the channel width and length being unequal for providing the unequal sensitivity.

5. A memory device comprising a plurality of memory cells and a network comprising a plurality of detector circuits being arranged in a distributed manner between the memory cells, wherein each of the detector circuits comprises a digital circuit having a first state and a second state, the digital circuits being sensitive to at least one of the effects of ionizing radiation and fluctuations of a supply voltage, and wherein the plurality of detector circuits form a chain in which an output of one detector circuit is connected to an input of another detector circuit, and the output node of the last detector circuit of the chain forms the output node of the chain.

6. The memory device according to claim 5, wherein the detector circuits are arranged in a substantially uniformly distributed manner between the memory cells.

7. The memory device according to claim 6, wherein the ratio of the number of detector circuits to the number of memory cells is between 1/10 and 1.

8. The memory device according to claim 5, wherein the ratio of the number of detector circuits to the number of memory cells is between 1/10 and 1.

* * * * *

UNITED STATES PATENT AND TRADEMARK OFFICE
CERTIFICATE OF CORRECTION

| | | |
|---|---|---|
| PATENT NO. | : 7,969,763 B2 | Page 1 of 1 |
| APPLICATION NO. | : 11/567533 | |
| DATED | : June 28, 2011 | |
| INVENTOR(S) | : Thomas Kuenemund | |

It is certified that error appears in the above-identified patent and that said Letters Patent is hereby corrected as shown below:

Title Page, Item [75] Inventor: please correct the last name of the inventor from Thomas Kunemund to --Thomas Kuenemund--

Signed and Sealed this
Seventeenth Day of January, 2012

David J. Kappos
*Director of the United States Patent and Trademark Office*